INVENTOR.
EDWIN L. ALLEN
BY
Bosworth & Sessions
ATTORNEYS.

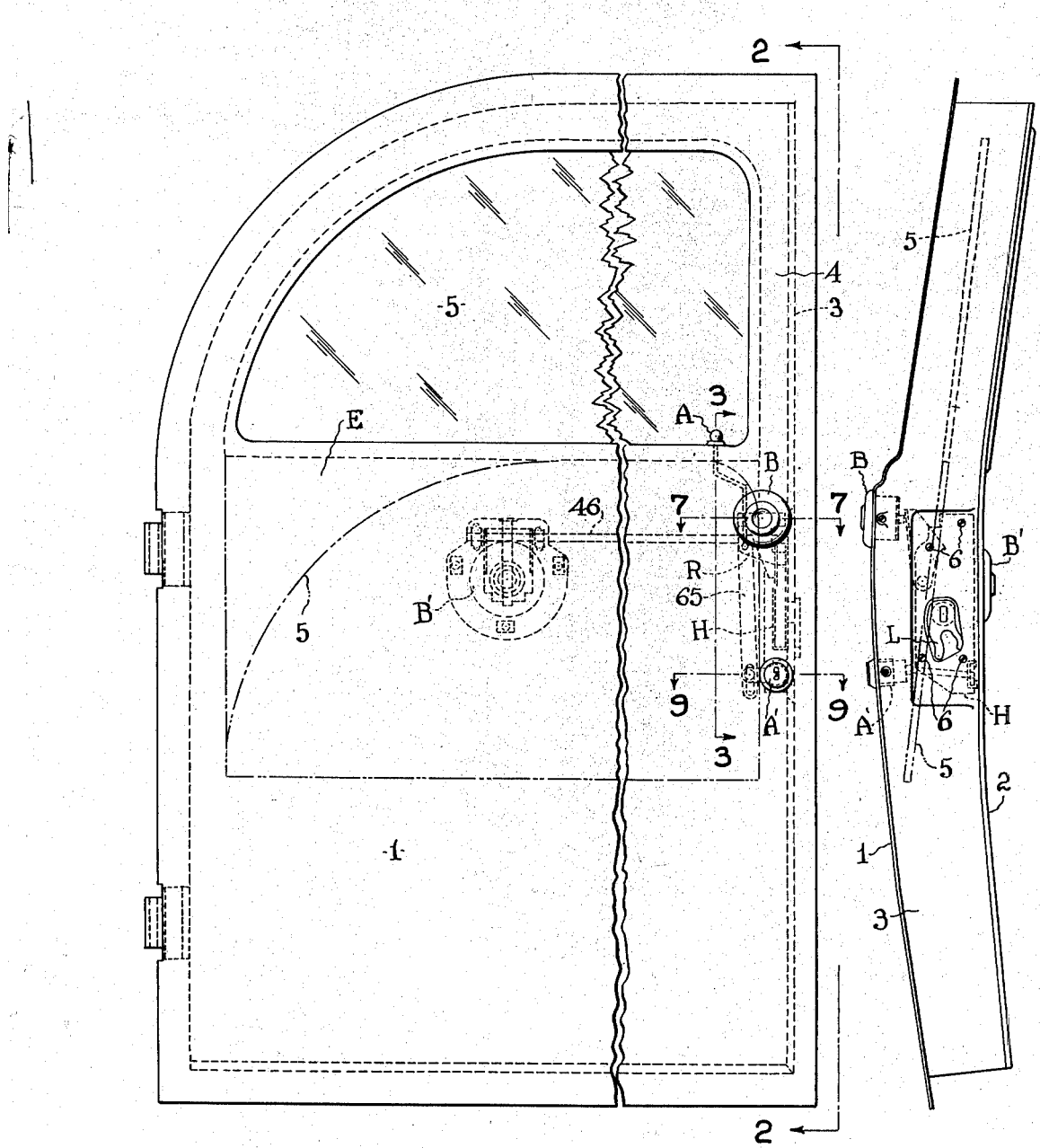

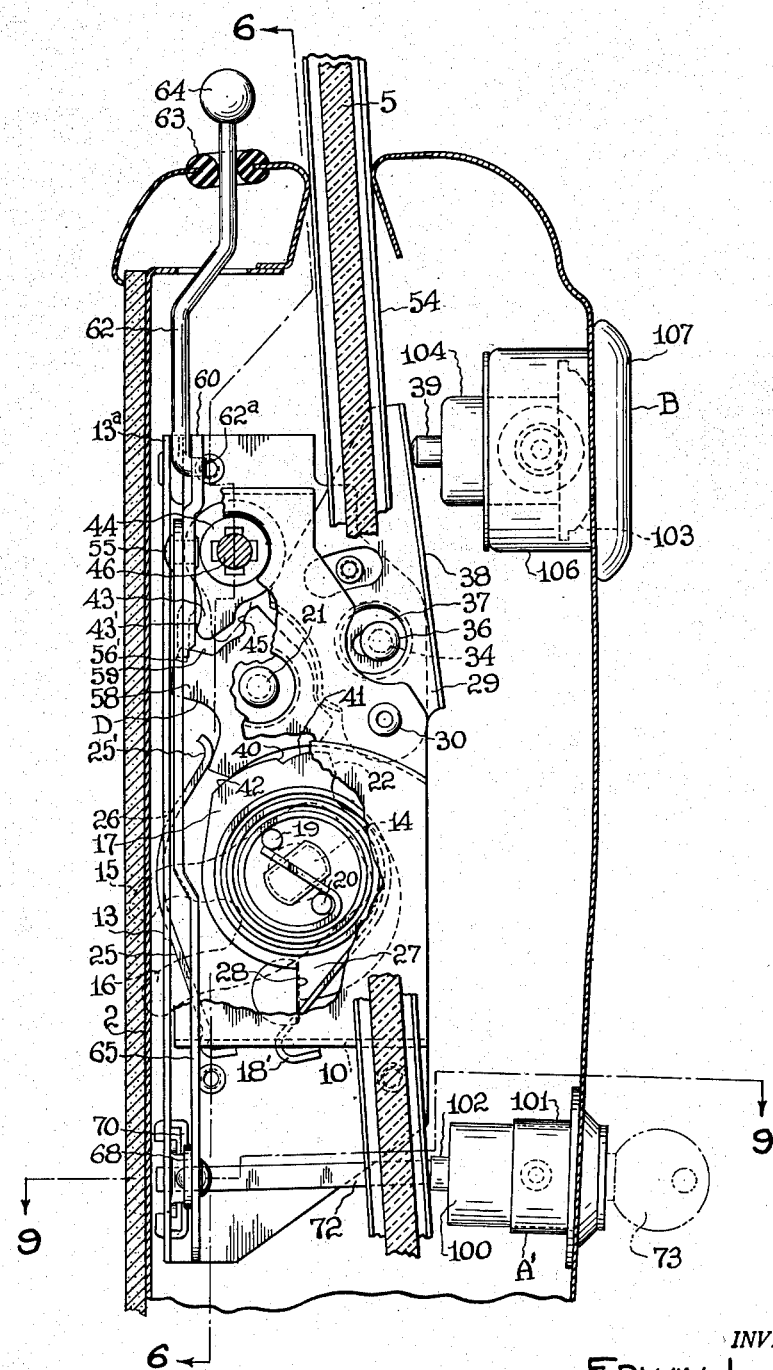

INVENTOR.
EDWIN L. ALLEN
BY Bosworth & Sessions
ATTORNEYS.

Nov. 10, 1953 — E. L. ALLEN — 2,658,783
DOOR CONTROL MECHANISM
Filed May 7, 1947 — 14 Sheets-Sheet 6

INVENTOR.
EDWIN L. ALLEN
BY
ATTORNEYS

Nov. 10, 1953  E. L. ALLEN  2,658,783
DOOR CONTROL MECHANISM
Filed May 7, 1947  14 Sheets-Sheet 7

INVENTOR.
EDWIN L. ALLEN
BY
Bosworth & Sessions
ATTORNEYS

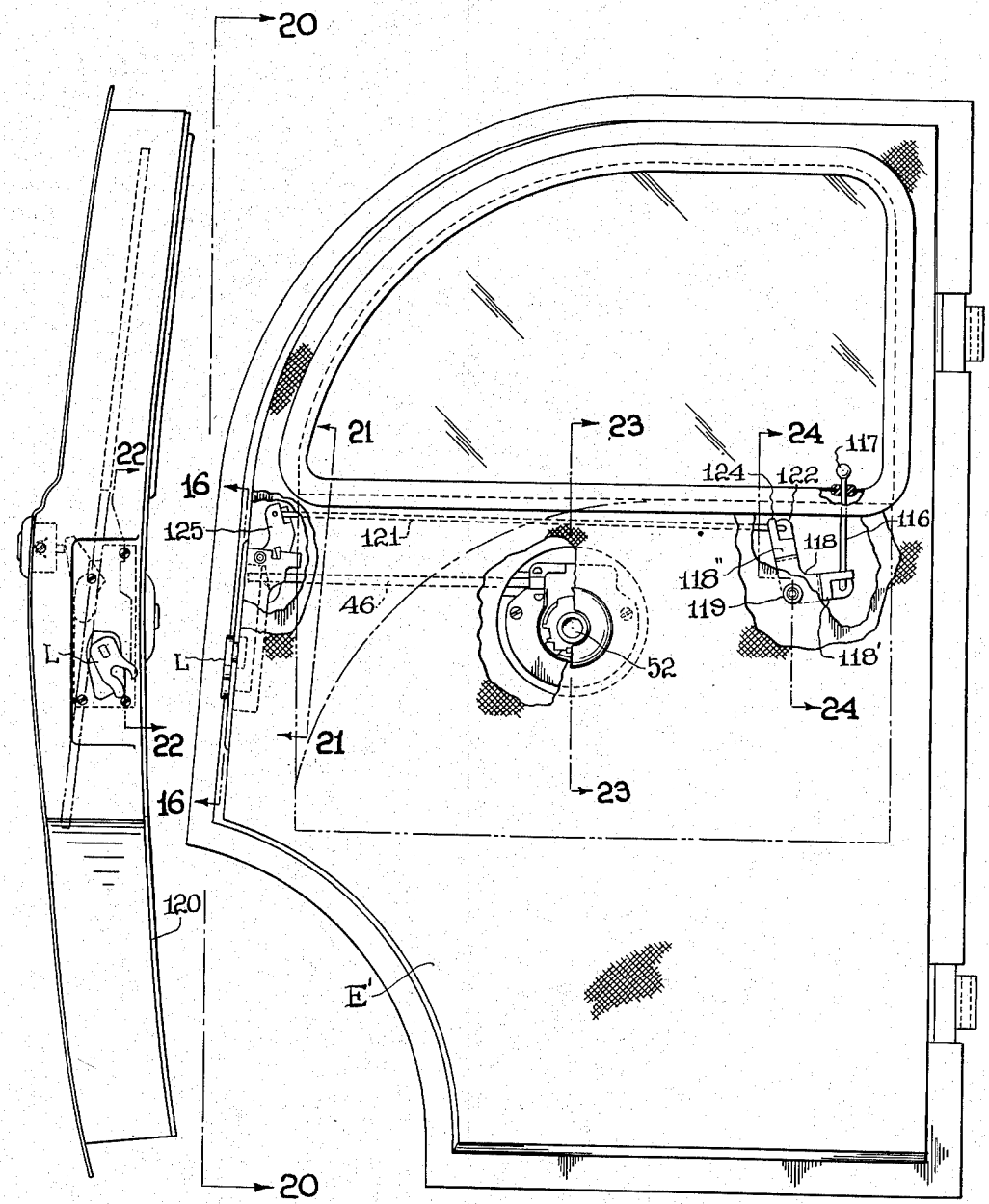

INVENTOR.
EDWIN L. ALLEN
ATTORNEYS.

Nov. 10, 1953     E. L. ALLEN     2,658,783
DOOR CONTROL MECHANISM

Filed May 7, 1947     14 Sheets-Sheet 13

INVENTOR.
EDWIN L. ALLEN
BY
*Bosworth & Sessions*
ATTORNEYS

Patented Nov. 10, 1953

2,658,783

UNITED STATES PATENT OFFICE 2,658,783

DOOR CONTROL MECHANISM

Edwin L. Allen, Cleveland Heights, Ohio, assignor, by mesne assignments, to Rudolph I. Schonitzer, Cleveland, Ohio Application May 7, 1947, Serial No. 746,521

5 Claims. (Cl. 292—216)

This invention pertains to door control mechanisms and more particularly to apparatus for effecting and controlling the latching, or latching and locking, of doors of the type commonly used on automotive vehicles.

In the Rudolph I. Schonitzer United States Patents Nos. 2,094,413 and 2,156,874, which issued on September 28, 1937 and May 2, 1939 respectively, certain door control mechanisms are described and claimed. The present invention relates to improvements in this general class of door control apparatus.

This type door control mechanisms may be broadly described as having coacting elements associated with the door and door frame structures whereby the door may be latched and held in closed position or released from closed position to permit opening thereof, and as including means whereby one of these coacting elements is retained in operative or door latched position when the door is closed and, when the mechanism is actuated to permit opening of the door, is moved into operated or door unlatched position by means of a power element such as a spring or the like.

My pending United States patent application Serial No. 713,220 filed November 30, 1946, and the Edwin L. Allen, Angelo R. DeVito, and Harold B. Muster pending United States patent application Serial No. 723,330, filed January 21, 1947, now Patent No. 2,587,583 issued March 4, 1952, disclose but do not claim certain features which are described and claimed herein and reference is hereby made to said co-pending patent applications.

Modern automobile body design requires that door latching and locking mechanisms which are used to control the vehicle doors occupy a minimum of space in order that the mechanisms may be incorporated in the doors, and/or the adjacent body pillar structures, without interfering with the raising and lowering of the window glass and without requiring an undesirable increase in the width of the door lock pillars or window frames. Automobile door control mechanism must also, of course, be extremely rugged and fool-proof and afford means for positively holding the door closed under most severe operating conditions. It is also desirable that means be incorporated in or associated with automobile door control mechanisms whereby one or more of the vehicle doors can be locked against unauthorized opening thereof and such locking means should be operable either from inside or outside of the vehicle.

Accordingly, among the objects of my present invention is the provision, in a door control mechanism having a locking or restraining member for preventing release of the mechanism from operative or door latched position, of inside and outside actuating means for the restraining member, each of which actuating means is at all times fully operable to move the restraining member into or out of its restraining position.

Other objects of my invention include the provision of a door control mechanism, particularly suited for automotive vehicle doors but not limited to use therewith, whereby it is impossible to close and lock the door in question from outside the vehicle except by use of a proper key or other locking device; the provision in a door control mechanism of remote control operating means therefor which may be installed in a plurality of positions remote from the control mechanism proper by merely reversing the position of one of the parts of the mechanism; the provision in a door control mechanism of means for operatively associating inside and outside actuating elements with a latch locking or restraining member whereby either of said inside or outside actuating elements may be operated to move the restraining member into or out of restraining position regardless of the position in which the restraining member may have previously been set by the other actuating element; the provision of a door control mechanism for automobile doors or the like which occupies a minimum of space and in which the moving parts are effectively protected from undesirable matter such as dirt, sprayed paint, ice, etc., and undesirable engagement with structural or operating elements, such as the glass run channel, etc., which might interfere with the proper functioning of the door control mechanism; the provision of a door control mechanism which may be installed to be operated to release and permit opening of the door either by push button actuated means or other type of elements such as handles, levers, etc.; the provision of a door control mechanism for automobile doors or the like which facilitates installation with substantial spacing between the latch member and the outside operating handle or push button, thus permitting convenient operation while retaining the most effective latch location; and the provision of an improved compact, rugged, door control mechanism which is particularly susceptible to easy installation and economical manufacture.

The above and other objects of my invention will appear from the following description of several embodiments thereof reference being had to the accompanying drawings in which:

Figure 1 is a side elevation of the left hand front door of an automobile, the door being hinged at its forward edge and incorporating my improved door control mechanism.

Figure 2 is a rear or free edge view of the door and door control mechanism illustrated in Figure 1, taken on line 2—2 of Figure 1.

Figure 4 is a view similar to Figure 3 but showing the latch in operated or door unlatched position and the restraining means in released or unlocked position, the outside push button operating means being illustrated in its inner or depressed position.

Figure 19 is a side elevation, taken from within a vehicle, of a left-hand rear door hinged at its forward edge, illustrating a remotely operative inside actuating means for the latch restraining mechanism and a remote control for the detent which holds the latch in operative position.

Figure 20 is an edge view of the door shown in Figure 19, taken substantially on line 20—20 of Figure 19 and showing the door control mechanism in its secondary operative position.

Figures 3, 3A:
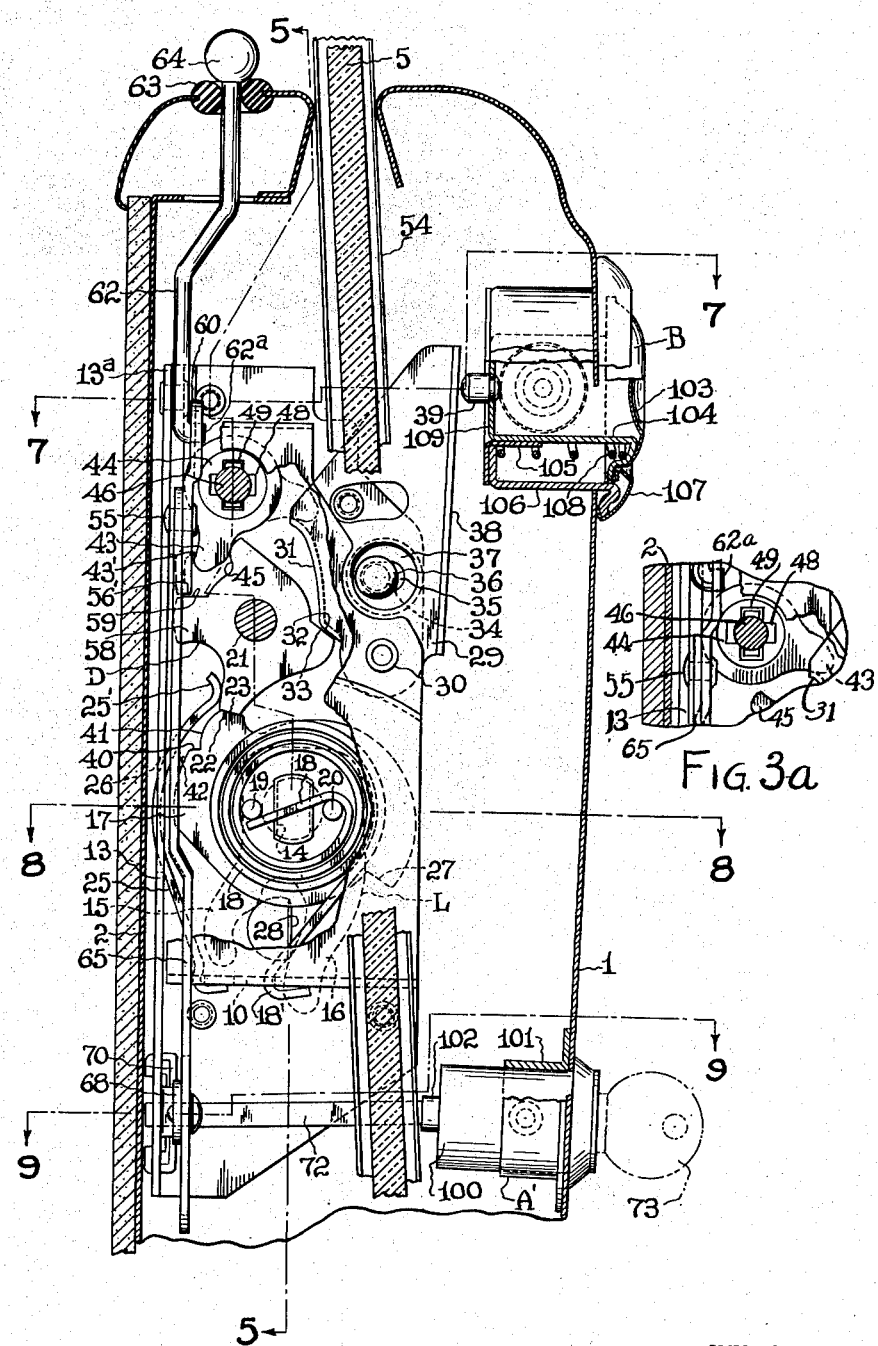
Figure 3 is an enlarged vertical cross-sectional view, taken on line 3—3 of Figure 1, illustrating my door control mechanism installed in a door with the latch in operative or door latched position and the locking or restraining means in locked or restraining position whereby opening of the door is prevented.
Fig. 3a is a fragmentary view showing a modified arrangement of the operating pawl from that shown in Fig. 3.

Although I have illustrated in the drawings, and will describe herein, my invention as applied to automobile doors, it will be understood that my improved apparatus is adaptable for use with numerous other types of doors or closures and where the term "door" is used herein it is intended that it be given its broadest meaning. Furthermore, although I have disclosed herein an arrangement wherein the movable latch member and its associated parts are carried by the door and the stationary keeper member is carried by the door frame it will be understood this arrangement may be reversed. So also the illustrated movable bifurcated latch member which coacts with a stationary keeper pin may be reversed or interchanged so that the latch member includes a pin and the stationary keeper is of bifurcated or slotted form. Accordingly, the phrase "latch member" is used in this specification and the accompanying claims as a broad descriptive term and is not intended to be restricted to the pivoted bifurcated latch member which is particularly shown and described herein.

Figure 5:
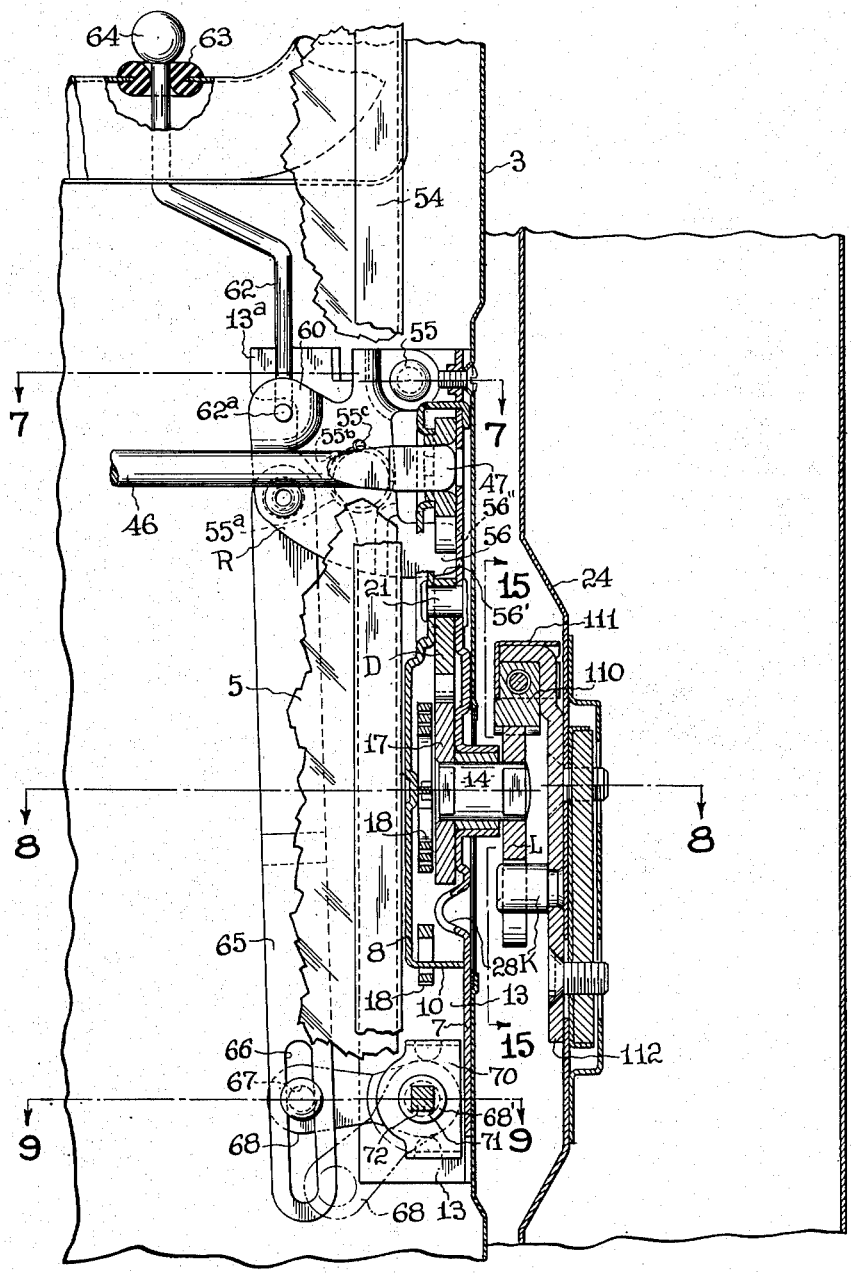
Figure 5 is an enlarged vertical cross-sectional view taken substantially on line 5—5 of Figures 3 and 8, both the door and adjacent body pillar structure being illustrated.

In Figures 1 and 2 I have illustrated my improved door control mechanism as installed in the left-hand front door of an automobile, the door being hinged at its forward edge and adapted to close against the body lock pillar (not shown in Figures 1 and 2 but seen in fragmentary vertical cross section in Figure 5). The door E has the usual outer panel 1 and inner panel 2 and the free edge wall 3 closes the rear edge of the door structure and forms the outer wall of the door lock pillar 4. Suitable means, not shown, are provided for raising and lowering the window glass 5, the lowered position of which is indicated in phantom lines. As will be more fully described later, the window 5 is supported and guided in glass run channels and it will be understood that the closer to the free edge wall 3 that the rear glass run channel can be located, the narrower can be the upper portion of the door lock pillar 4. Visibility from within the vehicle is of course improved by making the pillar 4 as narrow as possible.

My door control mechanism includes a main housing or frame structure, generally indicated at H, which is mounted on the inner face of the free edge wall 3 of the door as by screws 6, a movable latch member L pivotally supported by the housing H adjacent the outer surface of the edge wall 3 and movable substantially parallel thereto, an outside latch operating member in the form of a push button assembly B, an inside remote control latch operating member in the form of a second push button assembly B' mounted on the inner panel 2, inside actuating means A for the latch restraining or locking means, and an outside key controlled actuating unit A' for the latch restraining or locking means. All of these elements of my door control mechanism will be described in detail later and the above general description is made in connection with Figures 1 and 2 to give a general understanding of a typical installation of my mechanism in a door.

As is best seen in Figures 10 to 14 inclusive, the housing H of the door control mechanism installed in the door of Figures 1 and 2 includes a base plate 7 forming one side wall of the housing and adapted to be held against the inner surface of the door free edge wall 3 by the screws 6 engaging threaded holes 6' in the plate 7, and a cover plate 8 extending generally parallel to and spaced from the base plate 7. Integrally formed end walls 9 and 10 extend from the cover plate 8 and are secured to the base plate 7 as by bent over tangs or lugs 11 and 12. One edge of the housing H is substantially closed by the edge wall or side flange 13 which may conveniently be formed integrally with the base plate 7 and which, as will appear more fully later, projects somewhat beyond the cover plate 8 and supports the latch restraining or locking means and the actuating members therefor.

Extending through and having suitable bearing in the base plate 7 is the latch shaft 14 (see Figures 3 to 5). The latch member L is secured to the outer end of shaft 14 and, in the illustrated form of my invention, is bifurcated to form a pair of spaced portions 15 and 16 which may be termed, in accordance with their primary functions, the latch arm and door throwout and/or latch cocking arm respectively. Mounted on the inner end of shaft 14 within the housing H is the latch plate or control element 17, it being understood that both the latch arm L and the control element 17 are pivotally supported by the shaft 14 to have limited oscillating movement. A spiral spring 18 is disposed substantially coaxially or concentric with and adjacent the inner face of the latch control element 17 and has its inner end operatively connected to the control element 17 through the projection studs 19 and 20. The outer end of spring 18 extends downwardly through an aperture in the bottom end wall 10 and is bent as indicated at 18' to retain it in proper operating position. As the spring 18 is installed under tension it at all times tends to rotate the shaft 14, together with the latch member L and latch control element 17, in unlatching or door opening direction (clockwise as seen in Figures 3 and 4).

In order to maintain the latch L in position to hold the door closed a detent D is pivotally supported above the control element 17 on a pin 21 which is secured as by riveting to the housing H. The control element 17 and the detent D are provided with cooperating shoulder or abutment portions 22 and 23 which may be referred to respectively as a tooth and a pawl and are preferably formed on a radius from the center of the pin 21 in order to facilitate release of the control element from its door latched position.

In Figure 3 the latch L, latch control element 17 and detent D are shown in the positions they assume when the door with which the apparatus is associated is in closed and latched position. As the spring 18 always tends to move the latch L in clockwise direction this spring is wound up and the apparatus is in what may be termed "operative" or door latched position. In Figure 4 the parts just referred to are shown in the positions they assume after the detent D has been rotated in clockwise direction to disengage the abutment 23 from the abutment 22 thus permitting the spring 18 to rotate the shaft 14 together with the control element 17 and latch L into unlatched position which will permit the door to be opened. This latter position of my tripper type latch mechanism may be termed the "operated" or door unlatched position.

Figure 15:
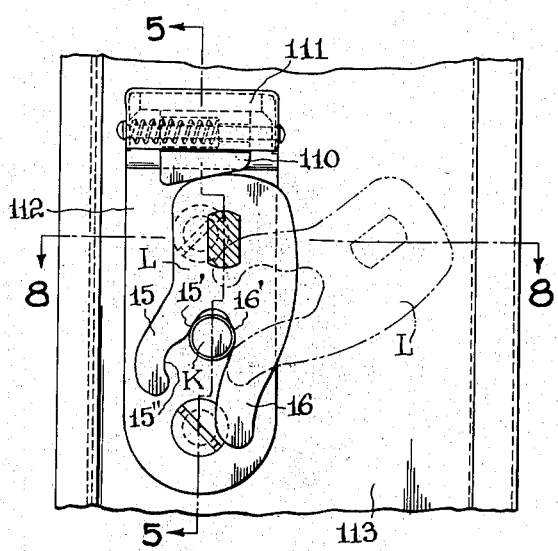
Figure 15 is a fragmentary vertical cross-sectional view, taken on line 15—15 of Figures 5 and 8, illustrating the latch and keeper members in operative or door latched position and showing the latch member in phantom lines in operated or door unlatched position.

In order to effect latching of the door E a keeper member in the form of a pin K is mounted on the face of the adjacent body pillar 24 (Figure 5). Figure 15 illustrates in full lines the relative positions of the latch member L and the keeper K when the door is closed and in phantom lines the position of the latch member L when the door is partially open and the door control mechanism is in operated or door unlatched position. In order constantly to urge the detent D into position to hold the control element 17 in operative or door latched position, as seen in Figure 3, a spring 25 is supported at its lower end by the bottom end wall 10 and has its upper end 25' pressing against the side of the abutment 23 of detent D. The spring 25 also engages the edge wall 13 in order to give the desired spring action. A slot 26 in the edge wall 13 permits the mid-portion of spring 25 to extend thereinto and to be guided against lateral displacement.

From the above description it will be seen that the detent D is constantly urged about its pivotal support 21 in counterclockwise direction (as seen in Figure 3) by the spring 25 while the latch control element 17 is constantly urged in clockwise direction about its pivotal support 14 by the spring 18. When the parts are in operated or door unlatched position as seen in Figure 4 and the door is moved into closed position the arm portion 16 of the latch member L strikes the keeper pin K causing the latch L, shaft 14 and control element 17 to move in counterclockwise direction. During this movement the spring 18 is being wound up or tensioned and when the door reaches fully closed position the control element 17 has been moved sufficiently in counterclockwise direction to permit the abutment 23 of the detent D to slide over the face of the abutment 22 of the control element 17 into the operative or door latched position shown in Figure 3. This engagement of the abutments 22 and 23 effectively prevents undesired release of the latch member L from its latched position. The degree of rotation of the latch member L when it moves from operative into operated position is limited by engagement of the stop 27 on the control element 17 with the boss 28 on the base plate 7 as is seen in Figure 4.

In order to operate the detent D to effect release of the control element 17 and permit movement thereof, together with the latch L, from operative or door latched position into operated or door unlatched position I provide a detent control member herein illustrated in the form of an arm generally indicated at 29 and pivotally mounted at its lower end on a pin 30 carried by the housing H. The inner edge 31 of control arm 29 is bent over to form a detent engaging face 32 which operatively engages the cam face 33 of detent D. Movement of arm 29 about its pivotal support 30 is limited by a pin 34 which is supported by the base plate 7, extends through a slot 35 in arm 29, and has a head portion 36 which assists in guiding and supporting the arm 29 by maintaining the boss 37 (see Figure 11) in sliding engagement with the inner face of base plate 7.

In Figure 3 the arm 29 is in its operative or door latched position with pin 34 engaging the left-hand end of slot 35. As detent D is urged in counterclockwise direction by spring 25 the arm 29 is urged in clockwise direction due to engagement of its detent engaging face 32 with the cam face 33 of detent D. Movement of both detent D and arm 29 under the influence of spring 25 is limited however by the pin 34 which is so positioned relative to slot 35 that a positive stop is provided when the detent abutment 23 is in proper latch blocking position as shown in Figure 3.

A flange 38 is formed on the outer edge of arm 29 and is adapted to be engaged by the operating plunger 39 of the outside latch operating unit B and it will be observed that, when the parts of my door control mechanism are in operative or door latched position as seen in Figure 3, and inward pressure is exerted on the upper end of the detent control arm 29, the resulting inward movement of arm 29 will cause the detent engaging face 32 thereof to act upon the cam face 33 of the detent D to rotate the detent in clockwise direction against the pressure of spring 25. This movement will cause the detent abutment 23 to move away from the control element abutment 22 permitting the spring 18 immediately to rotate the control element 17 in clockwise direction until the stop 27 strikes the boss 28 on the base plate 8. Of course this movement of the control element 17 causes similar movement of the shaft 14 and latch member L from operative or door latched position as seen in Figure 3 into operated or door unlatched position as seen in Figure 4.

In some instances it is deemed desirable to provide two different operative or latched positions for the latch member L. One of these positions may be termed the full operative or latched position and is as illustrated in Figures 3 and 15 and the other may be termed the secondary operative or latched position in which the door is not entirely closed and the latch member L is in the position shown in Figure 16. To accomplish this secondary latching action I provide a secondary abutment 40 on the control element 17 which is radially spaced from the full latched abutment 22. A cam surface 41 extends between the secondary abutment 40 and the main abutment 22 and another cam surface 42 extends away from the secondary abutment 40. By referring to Figure 4 it will be seen that the lower corner of the detent abutment 23 rests upon the cam surface 42 when the parts are in operated or door unlatched position and is held thereagainst by the spring 25. When the door is moved toward closed position engagement of the arm 16 with the keeper pin K causes the movable latch member L and control element 17 to move in counterclockwise direction and the lower corner of detent abutment 23 will slide along the cam face 42 until it reaches the secondary abutment 40 when it will move down into engagement therewith. Thus if the door should not be fully closed it will nevertheless be held in its secondary latched position by my control mechanism. As the door continues to move in closing direction beyond the secondary latched position and the latch control element 17 continues to rotate in counterclockwise direction, the lower corner of detent abutment 23 will be cammed outwardly by the cam surface 41 until it reaches the corner of the control element abutment 22 whereupon it is snapped into full latched position by the spring 25 as is seen in Figure 3. It will be understood that in normal operation of the door the mechanism moves through the secondary latch position without hesitation and that if the secondary latch arrangement is not desired it is only necessary to omit the secondary abutment 40 and continue the cam surface 42 to the corner or outer edge of the control element abutment 22.

The portions of my door control mechanism which have been described in detail up to this point in this specification provide means, operable from the outer side of the door, for latching and unlatching the door. It is also, of course, usually desirable to provide means for operating the latch mechanism from the inner side of the door and to accomplish this I provide, in addition to detent control member 29, another detent control member herein illustrated in the form of an arm or pawl 43 which is provided with a hub portion 44 pivotally supported in the cover plate 8. As seen in Figures 3 and 4 the pawl 43 is positioned to engage a cam face 45 on detent D. To move the detent D in clockwise latch releasing direction from its latch restraining position as seen in Figure 3 it is only necessary to rotate the pawl 43 in counterclockwise direction, thus causing corresponding clockwise rotation of the detent D until the abutment 23 is moved out of engagement with the abutment 22. This movement of pawl 43 may be accomplished entirely independently of the detent control lever 29 and thus provides a second control means for the release of the latch member L from its operative or door latched position. As the inside latch operating unit B′ (Figure 1) is usually located away from the edge of the door D, an operating member such as a shaft 46 is provided having a flattened end portion 47 (Figure 5) operatively engaged in one of the angularly spaced slots 48 or 49 in the hub 44 of pawl 43. This shaft 46, as is best seen in Figure 1, extends between and generally parallel to the outer and inner door panels 1 and 2 to the inside remote control latch operating assembly B′.

Figure 23:
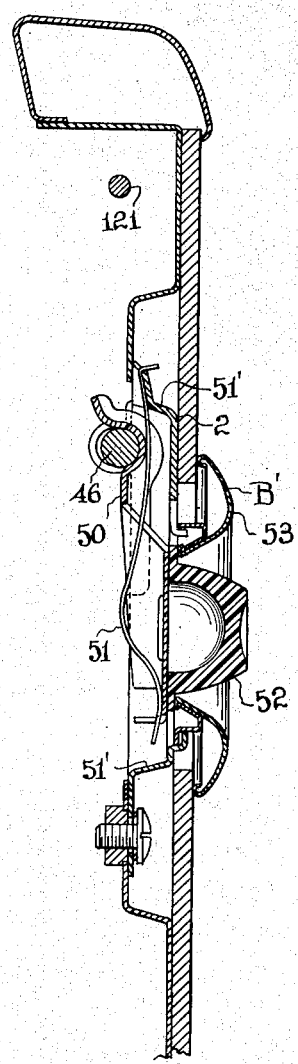
Figure 23 is an enlarged vertical cross-sectional view of the remote control operating push button for the door shown in Figure 19, taken on line 23—23 of Figure 19.
Figure 24:
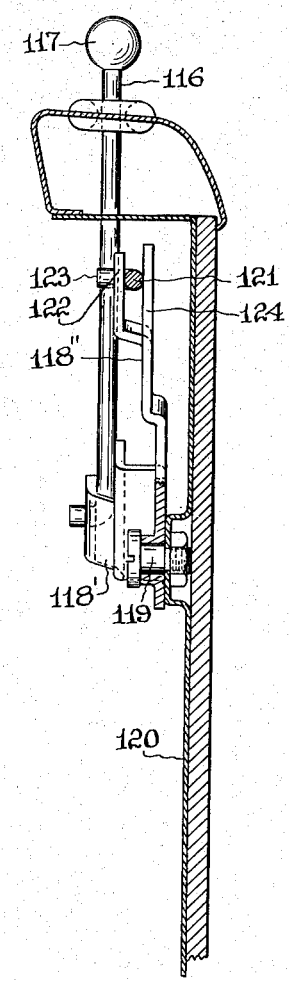
Figure 24 is an enlarged vertical cross-sectional view taken on line 24—24 of Figure 19 and illustrating the remotely operative inside restraining means construction.

This type of remote control assembly is illustrated in detail in Figure 23 and includes a downwardly extending arm 50 secured to the shaft 46 and normally urged toward the inner door panel (in counterclockwise direction as seen in Figure 23) by a spring 51 which is supported by the stationary frame member 51′. The push button 52, or other suitable actuating element, is held in position on the inner panel 2 of the door by a suitable escutcheon 53 mounted on frame 51' as by a bayonet joint, and it will be seen that inward pressure on the button 52 will cause corresponding rotary movement of the shaft 46. This movement of shaft 46 is transmitted to the pawl 43 causing rotation thereof in counterclockwise direction as seen in Figure 3 thus releasing the latch mechanism and permitting the latch member L to move into operated or door unlatched position.

In the installations of my door control mechanism shown in Figures 1 and 19 the inside latch releasing push button is located below the shaft 46 and at a relatively great distance below the lower edge of the window frame. However, in some cases it is desired to locate the push button or other operating means higher on the door panel. This can readily be accomplished by merely locating the push button 52 above the shaft 46 and changing the angular position of the pawl 43 during assembly of the device from that shown in full lines in Figure 3 to that shown in dot and dash lines in Figure 3 and in full lines in Figure 3a. When so assembled the face 43' of the pawl 43 will engage the upper end of the inner edge 31 of the detent control arm 29. It will be understood that when the push button 52 is disposed above the shaft 46 inward movement thereof will cause the shaft 46 to move in the opposite direction from that caused by movement of the push button when assembled below the shaft 46. This opposite rotation of the shaft 46 (clockwise as seen in Figure 3) will cause the face 43' of the pawl 43 to move the detent control arm 29 in counterclockwise or releasing direction and such movement will effect release of the latch member L in the same manner as though the arm 29 had been moved by operation of the outside operating assembly B. By providing the slots 48 and 49 in the hub 44 of pawl 43 the pawl may be assembled in either of the two positions which have been described above, which positions in the illustrated embodiment are approximately 90° apart, and in either case one of the slots 48 or 49 will be substantially vertically disposed, thus permitting the flattened end 47 of shaft 46 to be operatively connected to the pawl 43 in the same relative position regardless of which arrangement is employed. It will be understood that instead of forming intersecting angularly spaced slots in the hub 44 of pawl 43 as shown at 48 and 49, separate angularly disposed slots might be employed, or the aperture in the hub 44 could be of any other non-circular form, the end of shaft 46 being properly shaped to fit therein in a plurality of positions.

Figure 7:
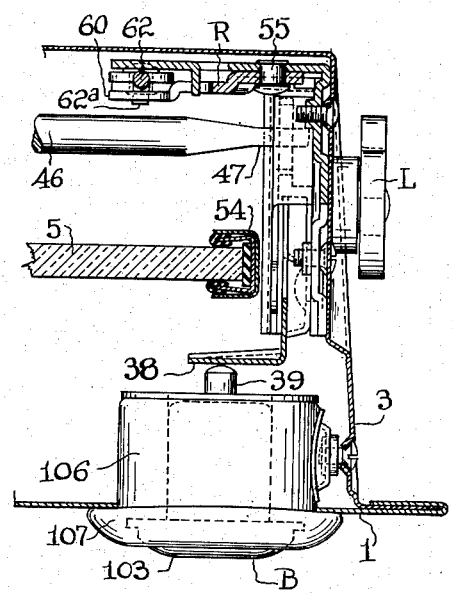
Figure 7 is a horizontal cross-sectional view taken on line 7—7 of Figures 1, 3 and 5.
Figure 9:
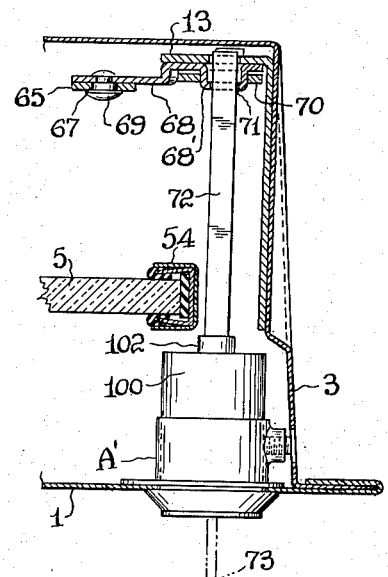
Figure 9 is a horizontal cross-sectional view taken on line 9—9 of Figures 1, 3, 4, 5 and 6.
Figure 8:
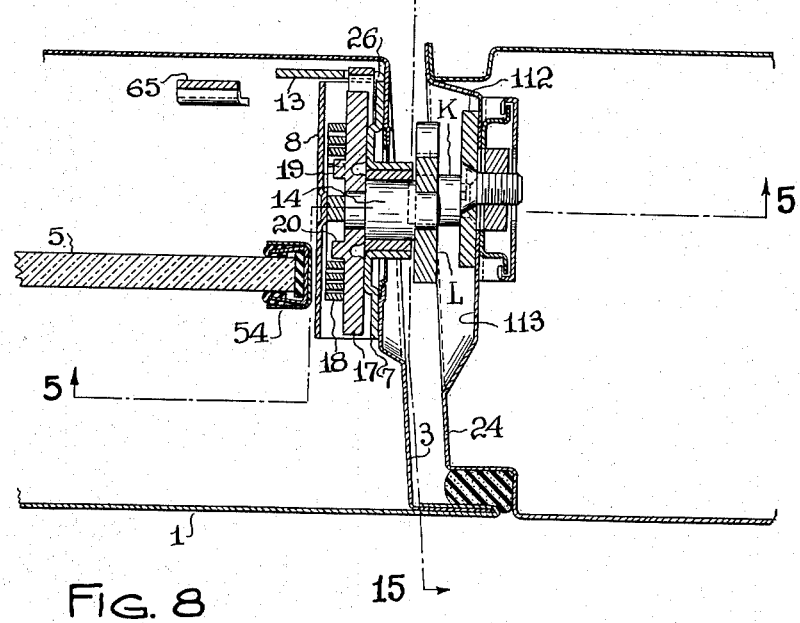
Figure 8 is a horizontal cross-sectional view taken on line 8—8 of Figures 3 and 5.
Figure 14:
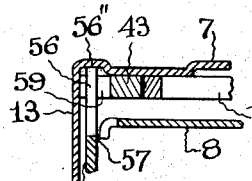
Figure 14 is a fragmentary horizontal cross section taken on line 14—14 of Figure 10.
Figure 13:
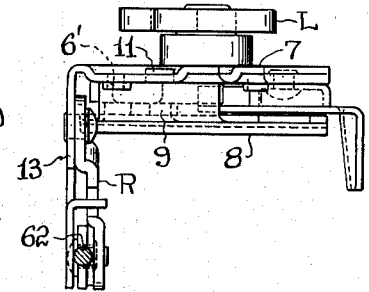
Figure 13 is a plan view of the unit shown in Figure 10.
Figures 10, 12:
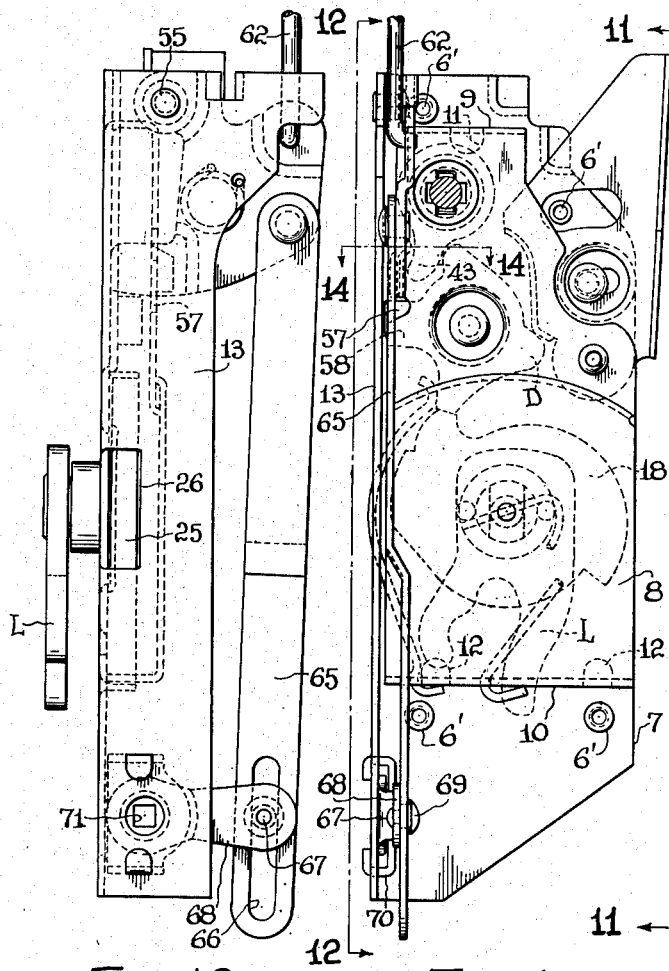
Figure 10 is a detached side elevational view of my improved door control unit looking toward the inner face thereof, the parts being shown in operative or door latched position.
Figure 12 is a view of the opposite side of the unit, taken on line 12—12 of Figure 10.
Figure 11:
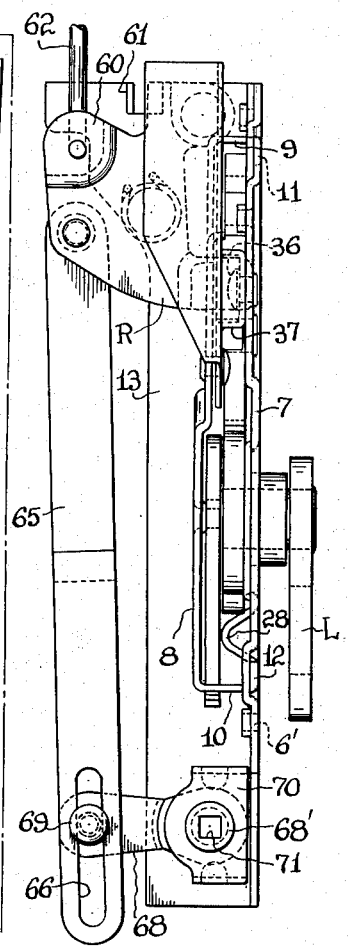
Figure 11 is a side elevation of the unit shown in Figure 10, taken on line 11—11 of Figure 10.

The window glass 5, as is clearly seen in Figures 5 and 7, is guided and supported at its edges by the usual glass run channels, one of which is indicated at 54. In designing an automobile door it is usually desirable to locate the glass run channel 54 as close as possible to the free edge wall 3 so that the width of the pillar 4 may be reduced to a minimum, thus obtaining maximum visibility from within the vehicle. In the illustrated door assembly the glass run channel 54 is located immediately adjacent the cover plate 8 of the door control mechanism housing H. Although a slight clearance between the cover plate 8 and the outer edge of the glass run channel 54 is indicated in the drawings it will be understood that at times, due to manufacturing inaccuracies, etc., this clearance may not be present and the glass run channel may engage the cover plate 8 of the housing H. In such cases however, due to the box-like form of the housing H and its substantially complete protection for the door control mechanism contained therein, there will be no interference with the proper functioning of the door control mechanism. My box housing arrangement also offers protection for the door control mechanism during installation and painting of the door assembly as well as comprising a simple, economical and rugged frame structure for the working parts supported and enclosed thereby.

In order to prevent unauthorized operation of the door control mechanism to release and permit opening of the door I provide means for restraining movement of the latch member L from operative or door closed position into operated or door released position. As illustrated in Figures 1 to 14 this restraining means comprises a detent blocking or restraining member R which is pivotally supported on a pin 55 carried by the edge wall 13 of the housing H. The member R lies generally parallel and adjacent to the edge wall 13 and has a lower detent engaging end 56 which is adapted to be moved into and out of restraining position upon movement of the member R about its pivotal support 55. Movement of the restraining member R into latch restraining position is limited by engagement of the end portion 56 with the inner surface of the base plate 7. Figures 3, 5 and 10 to 14 inclusive show this locking or restraining position of the restraining member R and it will be noted that, in order to permit the end 56 of member R to move to and from its locking or restraining position, the cover plate 8 of the housing H is cut back at 57 away from the edge wall 13 (see Figures 10, 12 and 14).

Detent D is formed with a projecting lock arm portion 58 having a stop face 59 which is adapted to be engaged by the lower edge 56' of the end portion 56 of the restraining member R. Figures 3 and 5 illustrate the door control mechanism in latch restraining position and it will be noted that when in this position the restraining member R has been swung counterclockwise (Figure 5) about its pivotal support 55 until the outer edge surface 56'' of end portion 56 has engaged the inner face of the base plate 7. When in this position the lower edge 56' of end portion 56 is disposed directly above and in blocking relation to the stop face 59 of the detent blocking arm 58. Thus rotation of the detent in clockwise direction (Figure 3) from its latch blocking or restraining position is effectively and positively prevented and the major part of any force which may be exerted by the detent stop face 59 on the blocking end 56 of restraining member R is transmitted radially through the member R to its pivotal support 55 which is carried by the housing H. Also, as seen from Figure 5, when member R is in restraining position any tendency of the detent D to move in latch released direction will exert a relatively small force tending to maintain the restraining member R in restraining position by swinging said member R about its pivotal support 55 in counterclockwise direction and causing the outer edge 56'' of end 56 to press against the base plate 7 which, in the illustrated structure, limits the movement of member R in detent blocking direction.

By positioning and supporting the detent D and the restraining member R as described above, attempts to move the detent D from its latch holding position in latch releasing direction toward its latch released position will not impose any substantial lateral bending load on the member R or cause pressure thereof against the edge wall 13. This permits the member R to be made substantially flat and of relatively thin material, thus reducing the over-all width of the entire mechanism. It will also be noted that the member R moves in a plane which is substantially parallel to the edge portion 13 on which it is mounted. When urged in latch releasing direction the stop face 59 of detent D engages the lower edge 56' of restraining member R and exerts a force or pressure thereagainst in a direction which is substantially parallel to the plane of movement of member R and normal to the axis of the pivotal support pin 55. This relation permits the angle between edge wall 13 and base plate 7 to be varied from that illustrated through a substantial range, to fit various door bevels or installation requirements, without interfering in any way with the operation of the restraining member R or requiring any change in the form or mounting of either detent D or restraining member R.

Figure 6:
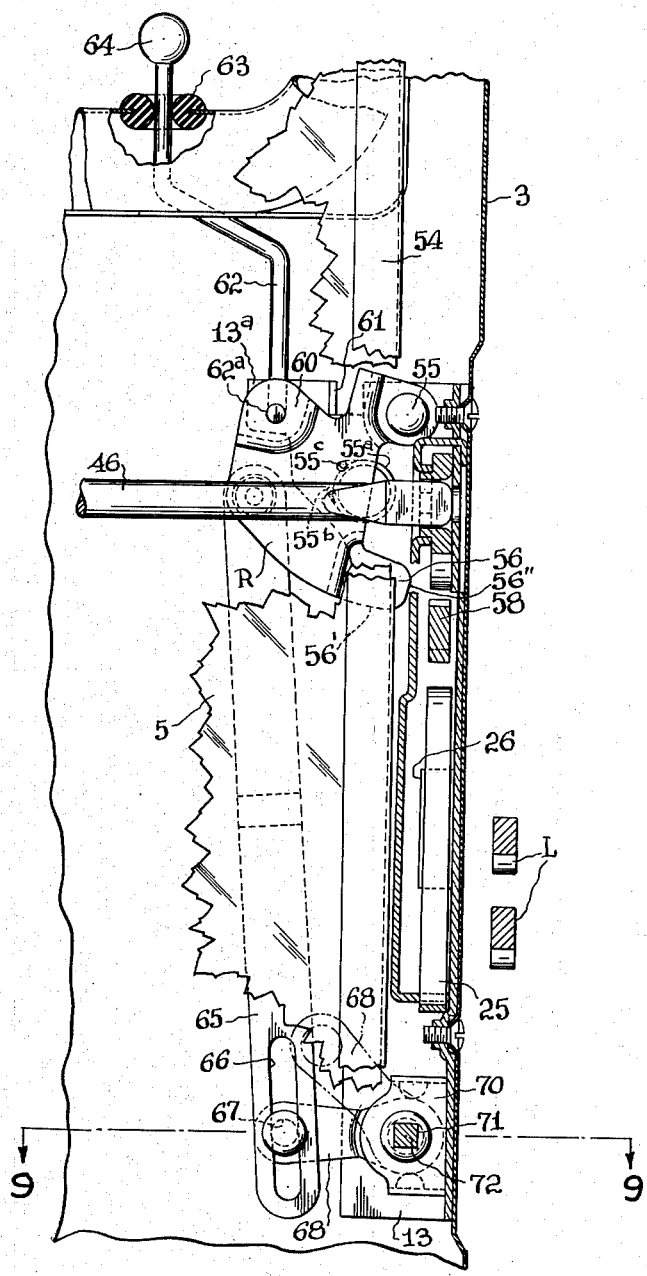
Figure 6 is a vertical cross-sectional view, taken substantially on line 6—6 of Figure 4, and being generally similar to Figure 5 except that the restraining means and inside actuating means therefor are shown in released or unlocked position and the latch member is shown in operated or door unlocked position. In this view the associated body pillar structure is omitted.

The unlocked or latch released position of the restraining member R is shown in Figures 4 and 6, it being noted in Figure 6 that the member R has been moved in clockwise direction on its pivotal support 55 until the upwardly extending portion 60 strikes the stop member 61 which is bent inwardly from the edge wall 13. In this position the detent blocking end 56 is moved completely out of the path of the detent block arm 58, thus permitting normal operation of the control mechanism as has been previously described.

In order to hold the restraining member R in either its released position as seen in Figure 6 or in its restraining position as seen in Figure 5 I provide a toggle or snap-over spring 55ᵃ which is of coil form and is disposed between the member R and the edge wall 13. One end, 55ᵇ of spring 55ᵃ is anchored to the edge wall 13 and the other end 55ᶜ extends into and is anchored in the restraining member R. When the member R is in released position as seen in Figure 6 the end 55ᶜ of spring 55ᵃ is located above the common center line of pivot pin 55 and the fixed end 55ᵇ of spring 55ᵃ. During movement of restraining member R from released position into restraining position, as seen in Figure 5, the end 55ᶜ of spring 55ᵃ moves across to a position below the common center line of pin 55 and fixed end 55ᵇ of spring 55ᵃ. This causes the snap-over action to take place and, as illustrated herein, occurs after the forward edge of end 56 of restraining member R passes the inner face of detent D. Thus, spring 55ᵃ starts to urge restraining member R into its released position just before the blocking end 56 completely moves out of the path of detent D and starts to urge restraining member R into restraining position just after end 56 first enters into restraining relation with detent D. By this arrangement of snap-over spring 55ᵃ the restraining member R is maintained in either released position or in restraining position and is not urged in restraining direction by the spring 55ᵃ until after the blocking end 56 is at least partially in detent blocking relation to the detent D. It will be understood that other types of toggle or snap-over spring mechanisms may be employed to carry out the functions of spring 55ᵃ.

To permit operation of the restraining member R from inside of the door I have provided actuating means indicated generally at A in Figure 1 and comprising an actuating rod 62 which extends up through a suitable grommet 63 in the door structure and is provided with an operating knob or the like 64 at its upper end. Figures 3, 4, 5 and 6 illustrate the manner in which the lower end of actuating rod 62 is operatively connected to the restraining member R. A hole is formed in the upper portion 60 of member R to accommodate the inwardly bent end 62ᵃ of rod 62. When in operating position the lower inner side of rod 62 extends parallel to and adjacent the face of end portion 60 while the opposite side of rod 62 is parallel to and guided by the projection 13ᵃ of the edge wall 13 of housing H. Thus the rod 62 is guided by the members 60 and 13ᵃ and the bent end portion 62ᵃ is held in position in the hole in the upper end 60 of the restraining member R. Installation of the rod 62 is easily effected when the restraining member R is in locking position as seen in Figure 5 by merely holding the rod 62 substantially at right angles to its normal operating position and inserting the end 62ᵃ in the hole in the upper portion 60 of restraining member R. This can be accomplished because, as is evident from Figure 5, the upper end 13ᵃ of the edge wall 13 is cut away to provide access to the hole when the member R is in restraining position. The rod 62 is then swung into its vertical or operating position between the members 60 and 13ᵃ. By properly spacing these members a rattle-proof, simple and easily assembled operating connection is provided between the rod 62 and the restraining member R. Screws, rivets or other securing devices are completely eliminated with corresponding reduction in cost and assembly time.

Figure 21:
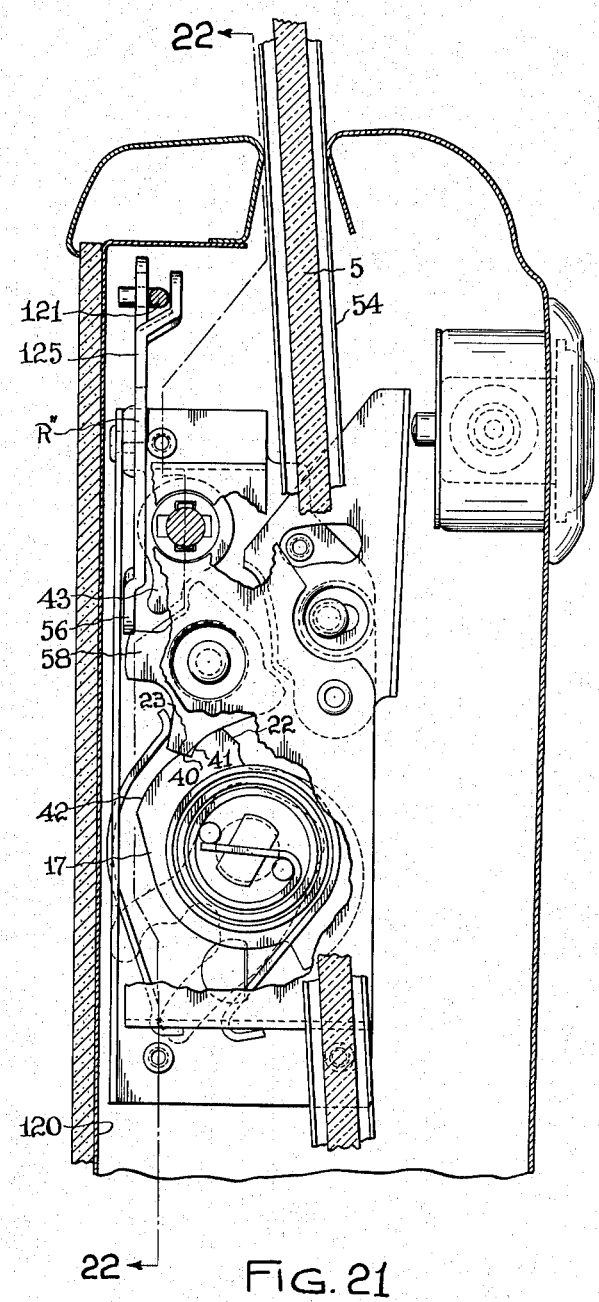
Figure 21 is an enlarged fragmentary view of the door control mechanism carried by the door shown in Figure 19 and taken on line 21—21 of Figure 19.
Figure 22:
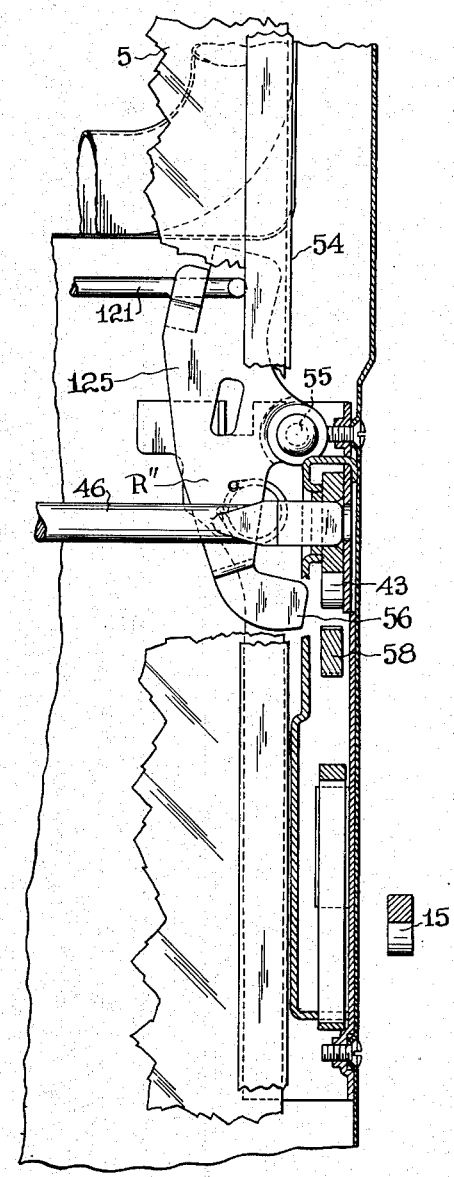
Figure 22 is an enlarged vertical cross-sectional view taken substantially on line 22—22 of Figures 20 and 21, the section being taken to include parts of the window glass and glass run channel.

Movement of the knob 64 from its upper or unlocked position as seen in Figures 4 and 6 into its lower or locked position as seen in Figures 3 and 5 will move the restraining member R into blocking position to prevent latch releasing movement of the detent D. This movement of the restraining member R, however, can occur only when the detent D, control member 17 and latch member L are in operative or door latched position. This will be seen from Figures 4 and 6, it being apparent that when the parts are in operated or door unlatched position, or in secondary latched position as seen in Figures 21 and 22, the detent lock arm 58 has moved upwardly into the path of the end 56 of restraining member R so that if the knob 64 is moved downwardly the restraining member R may be rotated in locking direction only until the end 56 strikes the inner side face of the detent lock arm 58. Thus the latch restraining means which I have incorporated in my door control mechanism is operable to prevent release of the latch mechanism only when the latch is in its operative or door latched position.

In addition to the inside actuating means for the restraining member R which has just been described it is, of course, desirable to provide means for operating the locking or restraining member R from the opposite side of the door D. In order to accomplish this, and to combine the latch restraining means which is incorporated in my control mechanism with a key controlled lock, I provide means for operatively associating the restraining member R with the outside key controlled actuating unit which has generally been referred to at A' in Figure 1. Connecting link 65 is pivotally secured at its upper end to the restraining member R and extends downwardly adjacent and generally parallel to the edge wall 13 of the housing H. At its lower end the link 65 is slotted at 66 to provide a limited lost motion connection with the pin 67 mounted on the arm 68. As may be clearly seen in Figure 9 the pin 67 is secured to arm 68 as by riveting and is provided with an enlarged head 69 which permits free sliding movement of the pin 67 in the slot 66. At its opposite end from the pin 67 the arm 68 is pivotally mounted in a bracket 70 secured to the edge wall 43 of the housing H, and the hub portion 68' of arm 68 is provided with a square hole 71 to accommodate the square end of shaft 72 of the outside lock or actuating unit A'.

The key for the lock unit A' is indicated in phantom lines at 73. This lock unit A' is preferably of the well-known tumbler type having a neutral position and two opposite end positions. The details of this lock mechanism need not be described as they form no part of the present invention but it will be noted that the lock unit is so installed that when the key 73 is in vertical position, as seen in Figure 3, it may be inserted into or withdrawn from the lock. When the key is turned from this vertical or neutral position into one of its end positions the shaft 72 is rotated in a corresponding direction and the arm 68 is moved downwardly into the position shown in phantom lines in Figure 5 while, when the key is rotated from its neutral position into its opposite end position, the arm 68 is moved into its upper opposite end position as seen in phantom lines in Figure 6.

As the key 73 may be withdrawn from the locking or actuating unit A' only when it is in its mid or neutral position it will be understood that the arm 68 will always be moved back into the neutral position shown in full lines in Figures 5 and 6 whenever the key is withdrawn from the lock. When the arm 68 is in its neutral position the pin and slot connection between arm 68 and link 65 will permit the restraining member R to be moved by the inside actuating mechanism A (comprising the rod 62 and knob 64) from restraining to released position and return at will and without changing the position of or exerting any substantial rotating force on the arm 68. Figure 5 illustrates the parts in door locked position and Figure 6 illustrates them in unlocked position it being noted that movement of the inside actuating mechanism A from locked to unlocked position merely causes the link 65 to be lifted, the slot 66 permitting relative sliding movement between link 65 and arm 68. Thus, whenever the key 73 is out of the lock unit A' the arm 68 will be in its neutral position and the door control mechanism can be manually locked or unlocked from inside the door as desired by the operator.

Now if it is desired to operate the restraining member R from outside the door this may be accomplished at any time regardless of the position in which the restraining member R may have been set by the inside actuating members 62 and 64. If the restraining member R is in released position as seen in Figure 6 and the key 73 is turned to move the arm 68 from its neutral position no movement of the restraining member R will occur because the pin 67 will merely slide in the slot 66. However, if the restraining member R is in released position and the key 73 is turned to move the arm 68 downwardly from its neutral position into its lower end position the first part of such downward movement will merely take up the lost motion in the pin and slot connection 66—67 until the pin 67 strikes the lower end of slot 66. When this occurs further downward movement of the arm 68 into its lower end position will act through the link 65 to move the restraining member R about its pivotal support into restraining position as seen in Figure 5. Before the key can be withdrawn after such movement, however, the arm 68 must be returned to its neutral position and the parts will then be as illustrated in Figure 5, the restraining member R being in blocking position relative to the detent D and the knob 64 being down in its door locked position.

If it is desired to unlock the door, the parts being in the position shown in Figure 5, this may be effected from the inside of the vehicle by lifting the knob 64. As described above this movement is permitted by the pin and slot connection 66—67 between the link 65 and arm 68. If it is desired to unlock the door from outside the vehicle it is only necessary to insert the key into the lock unit A' and turn it until the arm 68 moves upwardly into its end position as shown in phantom lines in Figure 6. During the latter part of this movement the link 65 is moved upwardly to swing the restraining member R into its released position as seen in Figure 6 and the rod 62 and knob 64 will also be moved upwardly into their upper or released positions. Next the operator returns the key to its neutral or mid-position thus bringing the arm 68 back to its neutral position, and withdraws the key from the lock.

From the above description it will be seen that I have provided a door control mechanism having latch restraining means, movable into and out of latch restraining position only when the latch member is in operative or full latched position, together with inside and outside actuating means for the latch restraining means whereby the restraining means can be operated at any time from either side of the door to either lock or unlock the door regardless of the position into which the restraining means may previously have been set.

The lost motion connections between the outside actuating unit and the restraining member which are illustrated in Figures 1 to 14 provide an extremely simple and effective arrangement for achieving this desired result. As the link 65 is located at the edge of the housing H, and as the operating shaft 72 is disposed below the bottom end wall 10 of the housing H, there is no interference with the glass run channel 54 which need be spaced from the free edge wall 3 of the door D only the thickness of the housing H. A locking or restraining member R is employed to effect locking of the door both from inside and outside thereof and this restraining member effectively blocks the detent D and positively prevents release of the latch member L from its operative or door latched position. The operator of a vehicle equipped with this type of door control mechanism cannot lock himself out by leaving his key inside the vehicle and getting out and closing and locking the door. He must close the door into fully latched position after he gets out of the vehicle and have the key in his hand in order to actuate the restraining member R and move it into locking position. However, if the operator re-enters the vehicle through the opposite door he may unlock the door which he has previously locked with his key by merely lifting on the inside actuating knob 64.

It is a characteristic of my door control mechanism that the major parts thereof are in entirely different positions when the door is closed and latched than they are when the door is unlatched and open. It is by virtue of this fact that the restraining member R may be so arranged that it can be moved into restraining position only when the latch member L is in operative or door latched position, thus making possible to provide independent inside and outside actuating means for a single locking or restraining member which acts directly on the latch control parts.

Figure 27:
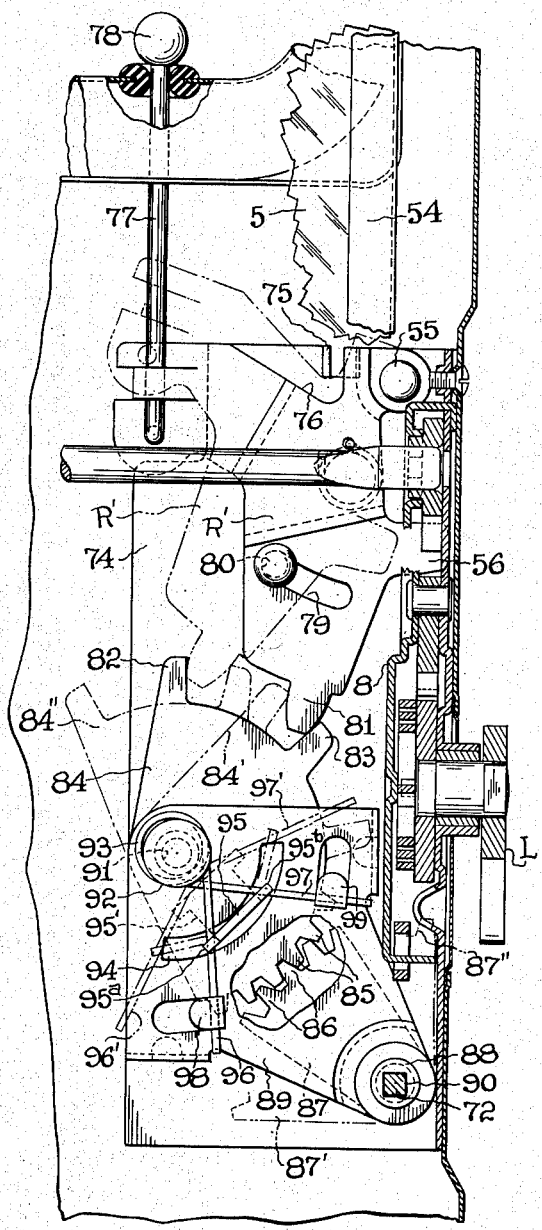
Figure 27 is a vertical cross-sectional view generally similar to Figure 5 but illustrating a modified arrangement for providing the desired lost motion connections between the latch restraining member and the actuating means therefor.

Although the lost motion connections illustrated in Figures 1 to 14 are extremely simple and effective it will be understood that other means may be provided for interconnecting the inside and outside actuating means and the restraining member. One such modified arrangement is illustrated in Figure 27. In this embodiment the latch member L and its associated operating parts are essentially the same as those previously described and will be referred to by similar reference characters. In the apparatus of Figure 27 however the edge wall 74 extends considerably beyond the cover plate 8. The restraining member R' is pivotally supported on a pin 55 in the manner previously described and is provided with a detent engaging end portion 56 having the same shape and function as previously described. The stop lug 75 on the edge wall 74 is engaged by the upper edge 76 of restraining member R' to limit the movement thereof in releasing direction. The inside actuating rod 77 is provided with a knob 78 and functions in the same manner as previously described to move the restraining member R' into or out of its latch locking or restraining position. As seen in full lines in Figure 27 the member R' is in locking or restraining position while as seen in phantom lines it has been moved into released or unlocked position. A slot 79 in restraining member R' and cooperating pin 80 carried by the edge wall 74 serve to guide and support the restraining member R' in its pivotal movement about the pin 55. Formed on the lower end of member R' is a tooth or lug 81 which is adapted to be engaged by spaced teeth or lugs 82 and 83 on the intermediate movable segment member 84. Gear teeth 85 on the intermediate segment 84 engage corresponding teeth 86 on the operating arm 87 which has a hub portion 88 pivotally supported between the edge wall 74 and the supporting plate 89 which is carried by and spaced from wall 74. The hub 88 is provided with a square hole 90 for the operating rod 72 which extends to and is operable by the same type of three position lock and actuating unit A' previously described.

The intermediate segment 84 is pivotally supported on a pin or shaft 91 which extends between the edge wall 74 and the supporting plate 89 and has an enlarged head 92 which serves as an anchor and retainer for the centering spring 93. An arcuate slot 94 is formed in the supporting plate 89 and a T-shaped flange 95 is cut out from the intermediate segment 84 as indicated at 95'. This flange 95 is bent out from segment 84 to project through the slot 94 and is movable therein with its T head portions 95a and 95b overlying the angularly disposed legs 96 and 97 of centering spring 93. The normal resiliency of spring 95 is such that the legs 96 and 97 thereof tend to move toward each other. They are restrained in neutral or mid-position however by the fixed lugs 98 and 99 which are struck out of the supporting plate 89.

As the parts are illustrated in full lines in Figure 27 the operating arm 87 is in its neutral or mid-position, the intermediate segment 84 is also in its neutral or mid-position, and the restraining member R' is in latch restraining position. When the arm 87 is moved downwardly into its lower end position, indicated in phantom lines at 87', the intermediate segment 84 is moved in clockwise direction into its locking end position as indicated in phantom lines at 84'. In like manner when the operating arm 87 is moved upwardly into its upper end position, as indicated in phantom lines at 87'', the intermediate segment 84 is correspondingly moved into its opposite releasing end position seen in phantom lines at 84''. The spacing between teeth 82 and 83 on intermediate segment 84 is such that the restraining member R' may be freely moved into or out of restraining position by the inside actuating knob 78 when the intermediate segment 84 is in neutral position without causing any movement of segment 84. However, if the restraining member R' is in restraining position and it is desired to move it into released position by the outside key controlled actuating unit this may be accomplished by turning the key to rotate shaft 72 and move the arm 87 from its neutral position into its upper end position 87'' during which movement the tooth 83 on intermediate segment 84 will engage tooth 81 on restraining member R' and move said member from its full line restraining position into its phantom line released position. Before the key can be withdrawn the arm 87, together with the intermediate segment 84 must be returned to the full line neutral position and thus, regardless of how the restraining member R' is set by either the inside or the outside actuating means it may be independently operated at any time by either of said actuating means. It will be understood that the coacting lugs or teeth 81, 82 and 83 on the restraining member R' and movable member 84 can also be arranged so that the two spaced lugs are on the restraining member and the single lug is on the movable member.

The legs 96 and 97 of spring 93 engage the opposite edges of the T-flange 95 when the arm 87 and intermediate segment 84 are in their mid or neutral positions. At the same time the ends of legs 96 and 97 engage the lugs 98 and 99 and thus the spring 93 tends to center and retain the segment 84 and the arm 87 in their neutral positions. When arm 87 is moved into its upper end position 87'' and segment 84 is correspondingly moved into its end position 84'', the spring leg 97 will be moved into the position indicated in phantom lines at 97', tensioning the spring 93. In like manner when arm 87 is moved into its lower end position 87' and segment 84 is moved into its corresponding end position 84' the spring leg 96 is moved by the T-flange 95 into the position indicated at 96'. Thus whenever the arm 87 is moved by turning the key in the lock unit from neutral to either of its end positions the spring 93 is tensioned and tends to return the segment 84, arm 87 and the key to their neutral or mid-positions. This action facilitates locking of the door by means of the key as it assists the operator in locating the center or neutral position of the lock in which the key may be removed and also tends to prevent the operator from inadvertently turning the key past the neutral position into the opposite end position before he withdraws the key from the lock.

Although, as has been previously noted, the outside actuating and locking unit A' may take any suitable form, provided merely that the lock have a neutral and two end positions, it may be pointed out that, as illustrated herein, the lock is of the cylinder type enclosed in a housing 100 (see Figure 3) mounted in a tubular flanged bracket 101 secured to the outer door panel I. The inner end 102 of the lock cylinder is connected, as by a universal joint or the like, to the shaft 72 which in turn is operatively connected to the arm 68.

It has also been previously mentioned that the outside push button assembly B may take any suitable form or may be replaced by other actuating means such as a handle or the like. In Figure 3 a push button arrangement is illustrated in which the button 103 carries an inwardly extending tubular extension 104 slidably supported in a sleeve 105 forming a part of the housing 106. The bezel 107 limits outward movement of the button 103 under the influence of coil spring 108 which engages and extends between the under side of button 103 and the fixed inner end of housing 106. The operating plunger 39 is carried by the end portion 109 of tubular member 104 and, as has been previously explained, is adapted to engage the flange 38 on the detent control arm 29. In Figure 3 push button 103 is illustrated in its normal outer position while in Figure 4 it is illustrated in depressed latch releasing position, it being understood that the spring 108 will always return the push button to its normal outer position when the button is released.

Figures 3 and 4 also illustrate the substantial vertical spacing between the latch member L and the flange 38 on control arm 29 and between the keeper pin K and the push button 103, it being seen that the centers of shaft 14 and keeper K are below the transverse horizontal center line of housing or frame H while the flange 38 is above this center line. This substantial spacing is desirable where, on account of the low center of gravity of the vehicle door or for other reasons, it is desired to locate the latch member L and its keeper K relatively low on the free edge of the door while, in order to facilitate convenient operation of the external operating means, it is desired to locate the push button relatively high on the outer door panel. This substantial vertical spacing or distance between the location of the latch member L or keeper K and the outside operating push button 103 is obtained in my improved door control mechanism by virtue of the previously described arrangement of the control member 17, detent D, and detent control arm 29 while maintaining an exceedingly compact door control assembly. Although the substantial spacing just described has been referred to as "vertical" it will be understood that the angular position of the control mechanism in a door may be varied as desired from the generally vertical arrangement herein illustrated. Therefore, where the term "substantial vertical spacing," or the like, is used in this specification and in the appended claims it is intended to refer to the distance between the latch member or the keeper and the portion of the detent actuating arm which is engaged by the push button or the like, regardless of whether this distance is actually vertical in the installation in question.

Figure 16:
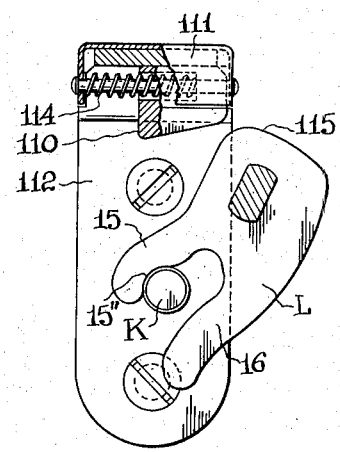
Figure 16 is a fragmentary illustrative view generally similar to Figure 15 but showing the latch and keeper elements in their secondary latch position.

To prevent undesirable vertical vibration or movement of the free edge of the door structure when the door is closed a simple and effective mechanism is provided which is clearly illustrated in Figures 15, 16, 17 and 18. This apparatus is generally similar to that disclosed in the above noted Schonitzer Patent No. 2,156,874 and comprises essentially a wedge block 110 slidably supported in a housing 111 carried by the bracket 112 which also carries the keeper pin K and is secured to the outer face 113 of the body pillar 24. Wedge block 110 is slidable transversely of housing 111 and is urged outwardly by a spring 114. As is seen in Figure 16 the block 110 is in its extreme outer position and the latch member L is in its secondary latch position. As the door is closed further into fully closed and latched position, as seen in Figure 15, the upper cam surface 115 of latch member L swings over in counterclockwise direction and engages the inclined lower face of wedge member 110, sliding the wedge member to the left into the position shown in Figure 15. As the latching and throw-out or cocking arms 15 and 16 of latch L engage the keeper pin K at spaced points 15' and 16', and as the cam surface 115 is in engagement with the wedge member 110, a three point contact is provided between the latch member L and the body pillar 113 which effectively and positively prevents vertical movement of the door relative to the body. The angle of inclination of the lower surface of the wedge 110 is such that pressure thereagainst by the cam surface 115 will not cause lateral movement of the wedge and the spring 114 also tends to hold the wedge 110 at all times in effective blocking relation with the surface 115 of latch member L.

The phantom line position of latch member L in Figure 15 illustrates the relation of the parts when the throw-out or cocking member 16 has just engaged the keeper pin K during closing movement of the door. Further closing movement of the door into fully closed position, as shown in full lines in Figure 15, swings the latch member L from its operated or unlatched position into its operative or latched position where it is held by the detent D as has been previously explained. To facilitate holding the door in its secondary latch position the latch arm 15 is recessed as seen at 15'' to form a groove substantially fitting the keeper pin K.

Figure 17:
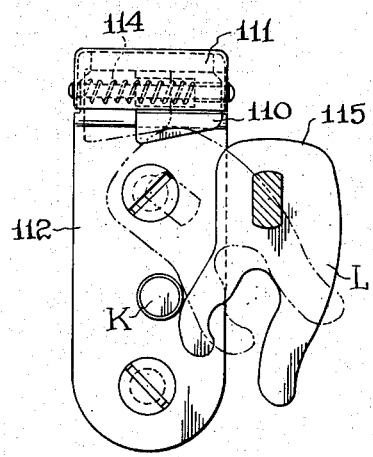
Figure 17 is a view generally similar to Figure 16 but illustrating the effect of an attempt to close the door when the latch mechanism is in operative position.

An additional desirable feature of my improved door control mechanism is that if in any manner the latch arm L should be moved into operative position when the door is open and an attempt is then made to close the door no damage or injurious shock will be imparted to the door control mechanism or its associated elements. Figure 17 illustrates in full lines the latch member L as just striking the keeper pin K while in operative position. The phantom line position of latch member L in Figure 17 illustrates how this member may continue to rotate beyond its normal full latched or operative position. This movement merely results in further tightening of the spring 18 and provides a resilient bumper effect against any attempt to close the door with the latch member L in operative position. It will also be noted in Figure 17 that during such movement of the latch member L the wedge 110 will be pushed to the left by the upper surface 115 merely compressing spring 114 and without any possible jamming or injury to the parts.

Figure 18:
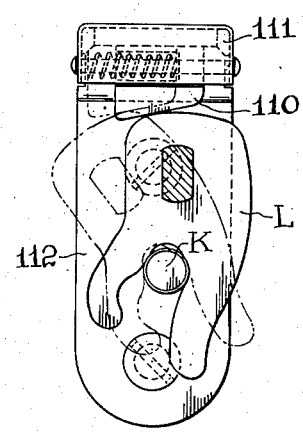
Figure 18 is a view generally similar to Figures 16 and 17 but illustrating the effect of movement of the door in closing direction beyond the normal closed position.

Figure 18 illustrates how my improved door control mechanism may be moved beyond its normal full operative position after the latch arm L has properly engaged the keeper pin K during normal closing movement of the door. Such over movement of latch arm L might possibly occur if the door weather seals or bumpers are improperly adjusted or worn. But in this case, as in the case of an attempt to close the door when the latch arm is in operative position, no injury or overload on the apparatus will occur as the member L merely moves beyond its normal position as shown in full lines in Figure 18 into the position shown into phantom lines with the resulting additional tightening of spring 18 and further movement to the left of the wedge block 110.

In Figures 19 to 24 inclusive I have illustrated a modified form of my door control mechanism which is particularly adapted for use on the rear doors of automotive vehicles or on any door where a key controlled outside lock is not desired. Figure 19 illustrates a left-hand rear automobile door E' hinged at its forward edge. The door control mechanism installed in this door is, insofar as the portions thereof contained in the housing H are concerned, substantially the same as that previously referred to herein and will therefore not be described in detail. Certain minor modifications will be referred to however but similar parts will be identified by the same reference characters as have previously been used.

In automotive rear doors which are hinged at their forward edges it is usually desirable to provide means easily reached from the front seat of the vehicle for locking the door from within the vehicle. I accomplish this by the vertically movable operating rod 116 having a suitable knob or the like 117 at its upper end and secured at its lower end to the bell crank lever 118. As is clearly seen in Figure 24 this bell crank lever 118 is pivotally supported on a pin 119 secured to the inner panel 120 of the door E'. One arm 118' of bell crank 118 extends generally horizontally while the opposite arm 118" extends generally vertically. A rearwardly extending rod 121 is simply and effectively secured to the arm 118" by striking out a portion 122 of the upper end of arm 118" and forming a hole therein to accommodate the outwardly bent end 123 of the rod 121. As the portion 122 of arm 118" is spaced from the upper end portion 124 thereof a distance substantially equal to the diameter of rod 121 a firm, rattle-proof and positive connection is established between the rod and bell crank. To assemble the rod to the bell crank arm 118" it is only necessary to position the rod substantially parallel to the arm 118", insert the end 123 in the hole in the struck out portion 122, and then swing the rod 121 down into the position shown in Figure 19. When in this position the rod end 123 cannot move out of the hole in portion 122 because of the engagement of the rod with the upper end 124 and the rod will be gripped sufficiently between the portions 122 and 124 to prevent rattling without interference with proper operation of the mechanism. This hook-up completely eliminates the use of screws, nuts, washers, etc. and a similar arrangement is illustrated to connect the lower end of operating rod 116 to the arm 118'.

The rear end of rod 121 is also connected in a similar manner to the upwardly extending end 125 of the restraining member R" (see Figure 22) and it will be seen that movement of the knob 117 downwardly from the position shown in Figure 19 will cause the restraining member R" to be moved from released position into restraining position with its end 56 in detent blocking position. In like manner lifting of the knob 117 from its lowered position will move the member R" into its released position as shown in Figures 21 and 22. The remote control inside latch releasing push button 52 is connected, as has been previously described, through a shaft 46 to operate the detent control pawl 43.

As it is not generally necessary or desirable to provide outside locking means for the rear doors of automotive vehicles the key controlled mechanism described in connection with the embodiment of my apparatus shown in Figures 1–14 is omitted in the apparatus which has just been described but otherwise, aside from the distinctions which have just been pointed out, the door control mechanism shown in Figures 19–24 is substantially the same as, and possesses the advantages of, the front door control mechanism herein shown and described.

Figure 26:
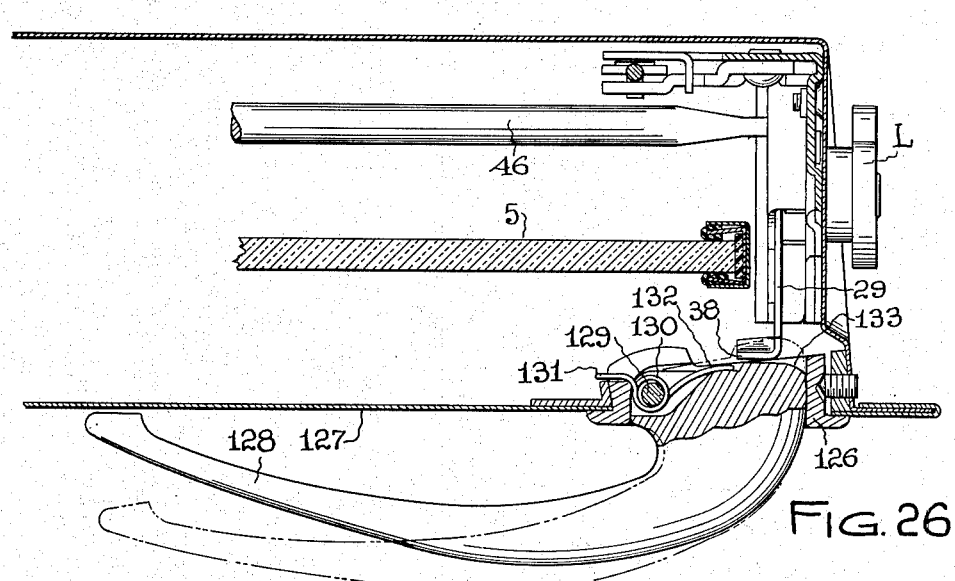
Figure 26 is a horizontal cross-sectional view taken on line 26—26 of Figure 25.
Figure 25:
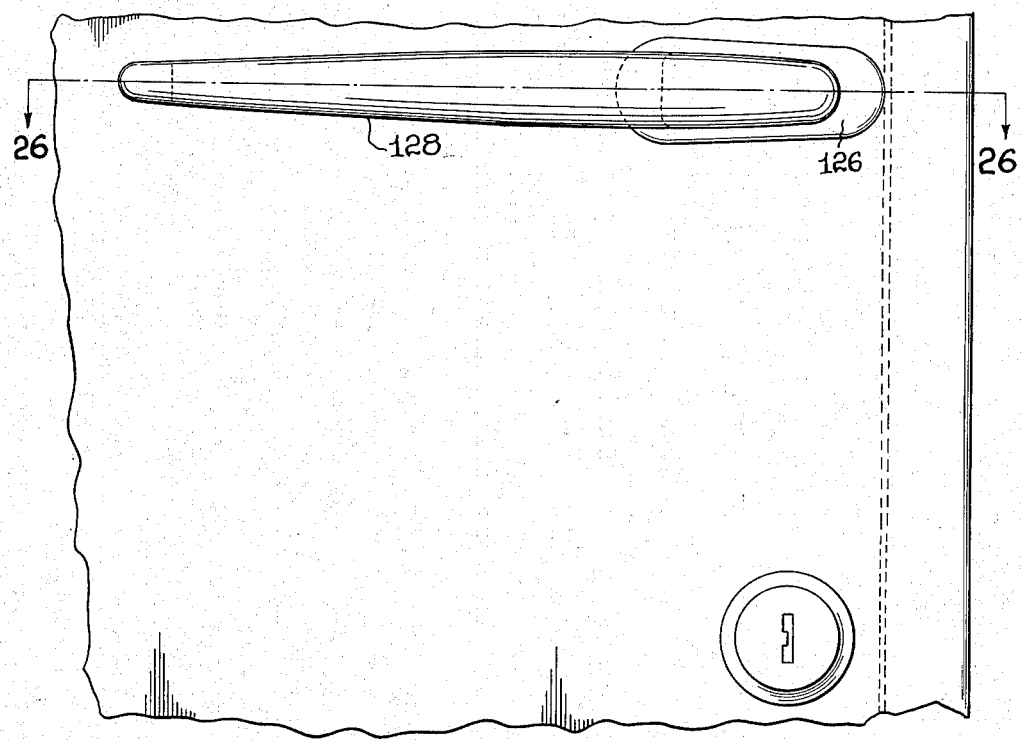
Figure 25 is a fragmentary side elevation, looking from the outside of the door, illustrating an installation of my door control mechanism wherein the outside operating push button shown in Figure 1 has been replaced by a handle.

It has previously been noted that although a simple push button arrangement provides an effective means for actuating the door control mechanism from the outside of the door it may in some cases be desired to employ a handle or other type of operating member. Figures 25 and 26 illustrate a simple handle arrangement which may be employed with the door control mechanisms herein described without any change whatever except for the substitution of the handle unit for the outside push button unit. The handle supporting frame 126 is suitably mounted in the outer door panel 127 and a horizontally extending handle or operating lever 128 is pivotally supported in the frame 126 on a pin 129. The spring 130 surrounds the pin 129 and has one end 131 bearing against the frame 126 and its opposite end 132 engaging the inner face of the right-hand end of handle 128. This spring tends to move the handle into door latched position or clockwise as seen in Figure 26. A cam face 133 is formed on the operating end of handle or operating lever 128 and is positioned to engage the upper end of flange 38 on detent control arm 29 whereby outward movement of the handle 128 from its full line position (Figure 26) into its phantom line position will cause corresponding inward movement of the cam face 133 to push the detent control arm 29 inwardly and release the latch member L thus permitting the door to be opened. It will be understood that various other operating arrangements such as rotating handles, grip actuated mechanisms, etc. may be employed for manually effecting operation of my door control mechanism either from outside or inside of the door.

The phraseology employed in this specification and the appended claims has been chosen for purposes of description and not of limitation and it will also be understood that, although I have described the illustrated embodiments of my invention in considerable detail, numerous variations and changes may be made in the arrangement and proportions of the parts without departing from the spirit of my invention. For example, although I have illustrated a housing H having a base plate 7 and a cover plate 8 and have shown a pin 21 extending between the base plate and the cover plate for pivotally supporting the detent D, such pivotal support pin might be secured to the base plate alone. In like manner the detent control arm 29 has been illustrated as pivotally mounted on the cover plate 8 but in some instances it may be desired to mount this pivotal support on the base plate 7. Other modifications in the form and arrangement of the parts will occur to those skilled in the art and I do not, therefore, wish to be limited to the particular devices herein shown and described but claim as my invention all embodiments thereof coming within the scope of the appended claims.

I claim:

1. In a door control apparatus including a base plate member, a cover plate member spaced from said base plate and forming therewith a box-like protective housing and support for a part of the mechanism of said control apparatus, a latch member shaft pivotally supported on said housing, a latch member secured to said shaft and disposed on the opposite side of said base plate from said cover plate, said latch member being adapted to move from operative to operated position when the door with which it is associated is unlatched and opened and to move from operated to operative position when the door is closed and latched, the combination of a latch member control element carried by said shaft and disposed between said base plate and said cover plate, a spiral spring member disposed adjacent said control element between said base plate and cover plate and substantially co-axially with said shaft, one end of said spring being anchored relative to said housing and the opposite end constantly exerting a force tending to rotate said control element, shaft, and latch member into unlatched position, a detent member, means carried by said housing for rotatably supporting said detent member, a detent control member pivotally supported on said housing at a point spaced from said detent support means, said control member having a detent engaging portion disposed between said base plate and said cover plate and an actuating member engaging portion disposed adjacent one edge of said protective housing, guide means for said detent control member carried by said base plate, an edge wall substantially enclosing the edge of said housing opposite said one edge thereof, a detent restraining member pivotally supported on said edge wall for movement relative thereto into and out of detent blocking position, said cover plate being recessed to permit movement of said restraining member into detent blocking position, and spring means substantially enclosed within said box-like housing and adapted to exert a force between said housing and said detent member tending to move said detent member into engagement with said latch member control element.

2. In a door control apparatus including a housing having a base plate portion and a side flange portion extending angularly from said base plate portion along one edge thereof, a latch member shaft pivotally supported on said base plate portion, a latch member secured to said shaft and disposed on the side of said base plate portion opposite from said side flange portion, said latch member being adapted to move from operative to operated position when the door with which it is associated is unlatched and opened and to move from operated to operative position when the door is closed and latched, the combination of a latch member control element carried by said shaft and disposed adjacent said base plate portion on the opposite side thereof from said latch member, a spiral spring member disposed adjacent said control element and substantially co-axially with said shaft, one end of said spring being anchored relative to said housing and the opposite end constantly exerting a force tending to rotate said control element, shaft, and latch member into unlatched position, a detent member, means carried by said base plate portion for rotatably supporting said detent member, a detent control lever pivotally supported on said base plate portion at a point spaced from said detent support means, said control lever having a detent engaging portion and an actuating member engaging flange portion disposed on the same side of the pivotal support of said lever and adjacent the edge of said base plate portion opposite said side flange portion, an actuating member manually operable from outside the door with which the apparatus is associated and having operating engagement with said flange portion of said detent control lever at a point spaced radially farther from the pivotal support of said control lever than said detent engaging portion, a detent restraining member pivotally supported on said side flange portion for movement relative thereto into and out of detent blocking position, and spring means extending between and in engagement with said housing and said detent member and tending to move said detent member into engagement with said latch member control element.

3. In a door control apparatus including a housing having a base plate portion and a side flange portion extending angularly from said base plate portion along one edge thereof, a latch member shaft pivotally supported on said base plate portion, a latch member secured to said shaft and disposed on the side of said base plate portion opposite from said side flange portion, said latch member being adapted to move from operative to operated position when the door with which it is associated is unlatched and opened and to move from operated to operative position when the door is closed and latched, the combination of a latch member control element carried by said shaft and disposed adjacent said base plate portion on the opposite side thereof from said latch member, a spiral spring member disposed adjacent said control element and substantially co-axially with said shaft, one end of said spring being anchored relative to said housing and the opposite end constantly exerting a force tending to rotate said control element, shaft, and latch member into unlatched position, a detent member, means carried by said base plate portion for rotatably supporting said detent member, a detent control lever pivotally supported on said base plate portion at a point spaced from said detent support means, said control lever having a detent engaging portion and an actuating member engaging flange portion disposed on the same side of the pivotal support of said lever and adjacent the edge of said base plate portion opposite said side flange portion, an actuating member manually operable from outside the door with which the apparatus is associated and having operating engagement with said flange portion of said detent control lever at a point spaced radially farther from the pivotal support of said control lever than said detent engaging portion, an arm member pivotally supported on said base plate portion for operating engagement with said control lever, a detent restraining member pivotally supported on said side flange portion for movement relative thereto into and out of detent blocking position, and spring means adapted to exert a force between said housing and said detent member tending to move said detent member into engagement with said latch member control element.

4. In a door control mechanism having a latch member having an operative or door latched position and an operated or door unlatched position; detent means adapted releasably to retain said latch member in operative position, a detent control member adapted to engage and move said detent means to effect release of said latch member from said operative position, means operable from the outside of the door with which the mechanism is associated for moving said detent control member to effect latch releasing movement of said detent, another detent control member pivotally supported independently of said detent and said first mentioned detent control member, said other detent control member having a hub portion with a non-circular aperture therein, an operating shaft for said other detent control member having an end portion formed to operatively engage said aperture, said operating shaft also having an operating arm portion spaced from said end portion, said other detent control member being angularly adjustable on said end portion of said shaft whereby, when in one angular position on said shaft, it will directly engage said detent and when in another angular position on said shaft it will directly engage said first named detent control member, and means for engaging said operating arm portion of said shaft to rotate said shaft in reverse directions according to the angular position of said other detent control member on said shaft.

5. In a door control apparatus including a housing having a base plate and a side flange along one edge of said base plate, a latch member shaft pivotally supported on said base plate, a latch member secured to said shaft and disposed on one side of said base plate, said latch member being adapted to move from operative to operated position when the door with which it is associated is unlatched and opened and to move from operated to operative position when the door is closed and latched, the combination of a latch member control element carried by said shaft and disposed adjacent said base plate, a spiral spring member disposed adjacent said control element and substantially co-axially with said shaft, one end of said spring being anchored relative to said housing and the opposite end constantly exerting a force tending to rotate said control element, shaft, and latch member into unlatched position, a detent member having a latch member control element engaging portion, means carried by said base plate for supporting said detent member and control element engaging portion for rotary movement about a fixed center, and a detent control lever pivotally supported on said base plate at a point spaced from said detent support means, said control lever having a detent engaging portion disposed between said side flange and the opposite edge of said base plate and an actuating member engaging flange disposed adjacent said opposite edge of said base plate and extending radially farther from the pivotal support of said detent control lever than said detent engaging portion.

EDWIN L. ALLEN.

References Cited in the file of this patent
UNITED STATES PATENTS

| Number | Name | Date |
|---|---|---|
| 1,326,193 | Harden | Dec. 30, 1919 |
| 1,638,231 | Archer et al. | Aug. 9, 1927 |
| 1,688,246 | Platt | Oct. 16, 1928 |
| 2,039,873 | Andersen et al. | May 5, 1936 |
| 2,094,413 | Schonitzer | Sept. 28, 1937 |
| 2,173,765 | Potter | Sept. 19, 1939 |
| 2,231,075 | Lakin | Feb. 11, 1941 |
| 2,242,993 | Domecki | May 20, 1941 |
| 2,249,018 | Marple et al. | July 15, 1941 |
| 2,259,670 | VanVoorhees | Oct. 21, 1941 |
| 2,270,559 | Rolph et al. | Jan. 20, 1942 |
| 2,315,815 | Rightmyer | Apr. 6, 1943 |
| 2,329,232 | VanVoorhees | Sept. 14, 1943 |
| 2,362,256 | Endter | Nov. 7, 1944 |
| 2,373,237 | Endter | Apr. 10, 1945 |
| 2,552,815 | Roethel | May 15, 1951 |